US008124152B2

(12) United States Patent
Janssen et al.

(10) Patent No.: US 8,124,152 B2
(45) Date of Patent: *Feb. 28, 2012

(54) FAT GRANULES

(75) Inventors: Johannes Jozef M Janssen, Vlaardingen (NL); Wim Theodorus Hogervorst, Vlaardingen (NL); Ronald Peter Potman, Vlaardingen (NL); Jan Hendrik T Verbeek, Vlaardingen (NL)

(73) Assignee: Conopco Inc., Englewood Cliffs, NJ (US)

( * ) Notice: Subject to any disclaimer, the term of this patent is extended or adjusted under 35 U.S.C. 154(b) by 949 days.

This patent is subject to a terminal disclaimer.

(21) Appl. No.: 11/884,292

(22) PCT Filed: Jan. 25, 2006

(86) PCT No.: PCT/EP2006/000801
§ 371 (c)(1),
(2), (4) Date: Apr. 23, 2008

(87) PCT Pub. No.: WO2006/087092
PCT Pub. Date: Aug. 24, 2006

(65) Prior Publication Data
US 2008/0317917 A1     Dec. 25, 2008

(30) Foreign Application Priority Data

Feb. 17, 2005  (EP) .................................. 05075384
Feb. 17, 2005  (EP) .................................. 05075391
Feb. 17, 2005  (EP) .................................. 05075392
Feb. 17, 2005  (EP) .................................. 05075393

(51) Int. Cl.
*A23D 7/02*     (2006.01)

(52) U.S. Cl. ............. 426/285; 426/602; 426/607; 264/6

(58) Field of Classification Search .............. 426/285, 426/602, 607; 264/6
See application file for complete search history.

(56) References Cited

U.S. PATENT DOCUMENTS

| | | | |
|---|---|---|---|
| 2,521,219 A | 9/1950 | Hoiman et al. | |
| 2,615,160 A | 10/1952 | Baur | |
| 2,815,286 A | 12/1957 | Andre | |
| 3,120,438 A * | 2/1964 | McIntire et al. | 426/285 |
| 3,170,799 A | 2/1965 | Feuge | |
| 3,270,040 A | 8/1966 | Bradshaw et al. | |
| 3,295,986 A | 1/1967 | Saslaw et al. | |
| 3,338,720 A | 8/1967 | Pichel | |
| 3,425,843 A | 2/1969 | Japikse | |
| 3,528,823 A | 9/1970 | Rossen | |
| 3,881,005 A | 4/1975 | Thakkar et al. | |
| 3,892,880 A | 7/1975 | Grolitsch | |
| 4,226,894 A | 10/1980 | Gawrilow | |
| 4,232,052 A | 11/1980 | Nappen | |
| 4,234,606 A | 11/1980 | Gawrilow | |
| 4,308,288 A * | 12/1981 | Hara et al. | 426/285 |
| 4,375,483 A | 3/1983 | Shuford et al. | |
| 4,385,076 A | 5/1983 | Crosby | |
| 4,391,838 A | 7/1983 | Pate | |
| 4,578,274 A * | 3/1986 | Sugisawa et al. | 426/96 |
| 4,591,507 A | 5/1986 | Bodor et al. | |
| 4,826,699 A | 5/1989 | Soe | |
| 4,855,157 A * | 8/1989 | Tashiro et al. | 426/609 |
| 4,889,740 A | 12/1989 | Price | |
| 5,130,156 A * | 7/1992 | Bergquist et al. | 426/453 |
| 5,391,382 A * | 2/1995 | Chappell | 426/96 |
| 5,429,836 A | 7/1995 | Fuisz et al. | |
| 5,447,735 A * | 9/1995 | Miller | 426/285 |
| 5,516,543 A | 5/1996 | Amankonah et al. | |
| 5,916,608 A | 6/1999 | Lanting et al. | |
| 6,020,003 A | 2/2000 | Stroh et al. | |
| 6,031,118 A | 2/2000 | Van Amerongen et al. | |
| 6,056,791 A | 5/2000 | Weidner et al. | |
| 6,117,478 A * | 9/2000 | Dubberke | 426/631 |
| 6,129,944 A | 10/2000 | Tiainen et al. | |
| 6,190,680 B1 | 2/2001 | Sakurada et al. | |
| 6,217,920 B1 | 4/2001 | Van Eendenburg et al. | |
| 6,248,389 B1 | 6/2001 | Biller et al. | |
| 6,316,030 B1 * | 11/2001 | Kropf et al. | 424/489 |
| 6,318,030 B1 | 11/2001 | Kropf et al. | |
| 6,322,842 B1 | 11/2001 | Reddy et al. | |
| 6,352,737 B1 * | 3/2002 | Dolhaine et al. | 426/611 |
| 6,395,324 B1 | 5/2002 | Effey et al. | |
| 6,468,578 B1 | 10/2002 | Mayer et al. | |
| 7,601,184 B2 * | 10/2009 | Tischendorf | 44/275 |
| 2002/0034577 A1 | 3/2002 | Vogensen | |
| 2002/0048606 A1 | 4/2002 | Zawistowski | |
| 2002/0076476 A1 | 6/2002 | Kull et al. | |
| 2002/0168450 A1 | 11/2002 | Drudis et al. | |
| 2003/0124228 A1 | 7/2003 | Goto et al. | |
| 2006/0051479 A1 * | 3/2006 | Chiavazza et al. | 426/541 |
| 2006/0280855 A1 * | 12/2006 | Van Den Berg et al. | 426/601 |

FOREIGN PATENT DOCUMENTS

| | | |
|---|---|---|
| DE | 10253111 | 5/2004 |
| EP | 0021483 | 2/1984 |
| EP | 0294692 A2 | 12/1988 |
| EP | 0393963 | 10/1990 |
| EP | 0572051 | 5/1997 |
| EP | 0775444 | 5/1997 |
| EP | 0780058 A1 | 6/1997 |
| EP | 0897671 | 2/1999 |
| EP | 1114674 | 7/2001 |
| EP | 1197153 | 4/2002 |
| EP | 1238589 | 9/2002 |
| EP | 1285584 | 2/2003 |
| EP | 1419698 | 5/2004 |
| EP | 1795257 A | 6/2007 |
| EP | 1815752 A1 | 8/2007 |
| GB | 2095968 | 10/1982 |

(Continued)

OTHER PUBLICATIONS

International Search Report International Application No. PCT/EP2006/000801 mailed Aug. 11, 2006.

(Continued)

*Primary Examiner* — Carolyn Paden
(74) *Attorney, Agent, or Firm* — Gerard J. McGowan, Jr.

(57) ABSTRACT

Granule comprising lipid powder particles having a microporous structure.

9 Claims, No Drawings

FOREIGN PATENT DOCUMENTS

| | | |
|---|---|---|
| JP | 02299544 | 12/1990 |
| WO | WO 93/08699 | 5/1993 |
| WO | WO 95/21688 | 8/1995 |
| WO | WO 98/47386 | 10/1998 |
| WO | WO 01/00046 | 1/2001 |
| WO | WO 02/100183 | 12/2002 |
| WO | WO 03/103633 | 12/2003 |
| WO | WO 2005/014158 | 2/2005 |
| WO | W02006087091 A2 | 8/2006 |

OTHER PUBLICATIONS

European Search Report Application No./Patent No. 05075384.7 dated Jul. 13, 2005.
Gerber et al., "Effect of Process-Parameters on Particles Obtained by the Rapid Expansion of Supercritical Solutions", Proceedings World Congress on Particle Technology, Jul. 1998, pp. 1-11, XP001080632.
Co-pending application Garbolino et al., U.S. Appl. No. 11/884,289, filed Aug. 14, 2007.
Co-pending application Garbolino et al., U.S. Appl. No. 11/884,293, filed Aug. 14, 2007.
Co-pending application van den Berg et al., U.S. Appl. No. 10/564,944, filed Jun. 20, 2006.
Co-pending application PCT/EP2009/066098 filed Dec. 1, 2009.
Co-pending application PCT/EP2009/066093 filed Dec. 1, 2009.
Co-pending application Barendse et al., U.S. Appl. No. 11/884,282, filed Jul. 14, 2008.
Co-pending application Janssen et al., U.S. Appl. No. 12/086,096, filed Jun. 5, 2008.
Kochhar, S.P. "Influence of Processing on Sterols of Edible Vegetable Oils", Prog. Lipid Research, 1983, vol. 22, pp. 161-186.
Gunstone et al., The Lipid Handbook, Second Ed., 194. p. 321.
Office action dated Feb. 18, 2011 for Garbolino, U.S. Appl. No. 11/884,293, filed Aug. 14, 2007.
Assignment from FeyeCon to Unilever Nederland B.V. dated Jul. 17, 2003.
Acknowledgement from Frank E. Wubbolts bearing a date of Jul. 17, 2003 and signature dates of Nov. 25, 2003.
Turk et al., "Micronization of pharmaceutical substances by the Rapid Expansion of Supercritical Solutions (RESS): a promising method to improve bioavailability of poorly soluble pharmaceutical agents". The Journal of Supercritical Fluids, vol. 22, No. 1 (Jan. 2002), pp. 75-84, XP004313515.
Belitz et al., Food Chemistry, $2^{nd}$ Ed., 1999, Springer-Verlag, Berlin, Heidelberg, New York, p. 472, table 10.4, XP002264854.
Anonymous, "Particle sizes of milk powders", Dairy Ingredients Fax, vol. 2, No. 4, 8, 4//00, XP002264853.
Van den Enden et al., Rapid Determination of Water Droplet Size Distributions by PFG-NMR, Journal of Colloid and Interface Science 140 (1990), p. 105-113.
Ullmanns Encyclopedia, $5^{th}$ Ed., vol. A-16, 1990, pp. 156-158.
European Office Action date Apr. 29, 2010 for EP 1855192.
Fischer, Food Ingredients and Analysis Int'l, Food Ingredients and Analysis Int'l, May 1, 2001, vol. 73, No. 3, 29-31.
Pernetti et al, Structuring of edible oils by alternatives to crystalline fat, Colloid & Interface Science, Jul. 18, 2007, vol. 12, 221-231.
Shahidi et al, Margarine processing plants and equipment, Edible Oil and Fat Product, 2005, 5, 502 and 518.
Munuklu et al, Particle formation of edible fats using the supercritical melt micronization process (ScMM), J of Supercritical fluids, 2007, 43, 181-190.

* cited by examiner

FAT GRANULES

FIELD OF THE INVENTION

The invention relates to granules comprising fat powder. The invention further relates to use of these granules in the preparation of edible dispersions and/or tablets.

BACKGROUND TO THE INVENTION

Powdered lipids, lipid granules, lipid cubes and lipid tablets are known. However these known product cannot be used to structure an oil phase in a food product comprising an oil phase, in the same way as such a product is structured by lipid crystallized from the melt, such as in a votator process for the preparation of margarine.

There is also a need for particular formulations (e.g. concentrates) for soups, sauces, boullions, seasonings which particulate formulations can disperse quickly in an aqueous liquid and/or in a food composition. There is also a need for a process for manufacturing seasonings and particular formulations for preparing boullions, broths, soups, which are in the form of cubes, tablets, etcetera. Usually such cubes or tablets are prepared using a process involving a compression step. Prior to such compression step, the ingredients are usually mixed. The ingredients are usually a combination of dry particulate ingredients (salt, MSG, herbs, spices, starch and starch derivatives) which typically 1-30 wt. % fat. Mixing such dry ingredients with fat can be cumbersome, e.g. involving melting of the fat, maturation times, and other inconveniences. Hence there is a need for an easy way of manufacturing such seasonings and concentrates for bouillons, broths, soups sauces in cube or tablet form.

Co-pending application PCT/EP2004/006544 describes edible dispersions, including water-in-oil emulsions, that comprise a structuring agent, specifically fat, having a microporous structure of submicron size particles. The water-in-oil emulsion may be a table spread. In the examples pourable emulsions and pourable dispersions were described. The edible dispersions may for instance be prepared by mixing an oil phase with structuring agent particles with a separately prepared water phase.

SUMMARY OF THE INVENTION

One or more of the above problems are solved according to the invention which provides a granule comprising lipid powder particles (herein described as secondary particles) that have a microporous structure and which are agglomerates of primary particles of submicron size.

We have found that micronised fat particles such as used in PCT/EP2004/006544 can become airborne and can be described as dusty. When using the micronised fat powder to produce food products, this dustiness influences the handling properties of the powder negatively. Additionally, we have found that micronised fat powder has a very low bulk density. This creates the problem that a certain mass of powder takes in a huge space if it is transported.

The invention therefore relates to a granule comprising:
a) solid micronised lipid powder particles that have a microporous structure; and,
b) a liquid;
wherein the granule is an agglomeration of said lipid particles herein described as secondary particles; and wherein said secondary particles are agglomerates of primary lipid particles, said primary lipid particles are platelets having an average thickness of 0.01-0.5 μm.

DETAILED DESCRIPTION OF THE INVENTION

Granule is herein defined as an object prepared by size enlargement of secondary particles as described below.

The following terms are used herein to describe the properties of the granules according to the invention.

Although such particles are herein referred to as granules, and they can be prepared by granulation, such granule-particles can also be prepared by other known techniques for size enlargement of particulate material, as long as the desired particle size of the granules is obtained, and particles with the proper rigidity. Thus, although called "granules" herein, it does refer to all particles having a certain size (being larger than most components of the granules such as powdery material and/or crystalline material), and such granules can be prepared by granulation, but also by other techniques. Thus, for a range of conventional ingredients for e.g. bouillon cubes (salt, MSG, flour, starch, maltodextrin, etcetera) a size enlarging technique is needed, that binds a plurality of such smaller particles (powdery materials such as flour and/or starch and/or crystalline materials such as salt, sugar, MSG) of the ingredients together to larger particles, herein referred to as granules. Suitable techniques for such size enlargement are known in the art and include granulation, agglomeration, pelletisation, sintering, briquetting or extruding followed by cutting the extrudates and other techniques as known in the art of size enlargement of particulate matter. The granules suitably have a diameter of between 0.5 and 10 mm (some fines may be allowed, at least 80 wt. % should have such size), preferably between 1 and 5 mm, more preferably 2-5 mm.

According to the invention, the granules are agglomerates of solid micronised lipid powder particles, herein described as secondary particles.

According to the invention, the solid structuring agent particles described herein as secondary particles should have a microporous structure of submicron size particles which are described herein as primary particles.

The secondary particles are agglomerates of primary particles which have a microporous structure. The size of the primary particles is submicron (that is have a diameter below 1μ).

Micronised fat (secondary particles) may be prepared herein as described in PCT/EP2004/006544, the disclosure which is incorporated herein by reference.

An example of a microporous structure is shown in FIGS. 6 and 7 of PCT/EP2004/006544. The primary particles typically have the shape as shown in FIG. 7, in which the platelets with submicron dimensions are the primary particles. The thickness of the platelets should be submicron, preferably the thickness is on average 0.01-0.5 μm, more preferably 0.03-0.2 μm, even more preferably 0.06-0.12 μm.

Equivalent good results were obtained for a secondary particles having a microporous structure of more bubble-like shape, such as shown in FIG. 10 of PCT/EP2004/006544. In such microporous structure the wall thickness of the bubbles should be submicron, for instance on average 0.01-0.5 μm, more preferably 0.03-0.2 μm, even more preferably 0.06-0.12 μm.

The secondary particles, may, in the course of the preparation of the dispersion, for instance through the force of a mixer, be broken into submicron particles. The resulting submicron particles will form the structuring network of the dispersion.

In the context of the invention, the granule comprises a liquid. Preferably the liquid content of the granule is 40-60 wt. %. Preferably the liquid is edible oil or w/o-emulsions of edible oil.

Preferably, the structuring agent is edible lipid, more preferably it is edible fat. Edible fats consist predominantly of triglycerides. Typically such edible fats suitable as structuring agent are mixtures of triglycerides, some of which have a melting point higher than room or ambient temperature and therefore contain solids in the form of crystals.

The solid structuring agent, also denoted as hardstock, serves to structure the fat phase and helps to stabilise the dispersion.

For imparting to common margarine a semi-solid, plastic, spreadable consistency this stabilising and structuring functionality plays an important role. The crystals of the solid fat form a network throughout the liquid oil resulting into a structured fat phase. The aqueous phase droplets are fixed within the spaces of the lattice of solid fat crystals. In this way coalescence of the droplets and separation of the heavier aqueous phase from the fat phase is prevented.

According to the invention micronised fat powder is subjected to agglomeration. This is done by spraying a sticky liquid on the micronised fat powder and gluing the these secondary fat powder particles together to secondary particles. This sticky liquid should be a liquid that is able to wet the powder, but is strong enough to form a bridge between primary powder particles. Preferably the sticky liquid is edible oil or w/o-emulsions of edible oil.

The granulation technique is not critical, for instance the primary micronised fat powder may be granulated in conventional granulation machines. Preferably the granulation is conducted as described above.

The granules according to the invention may be used as intermediate for making several fat containing products, such as cooking fats, spreads and liquid margarines. Also it is possible to use the powders as such in an end product or as powder to press tablets.

Surprisingly the granules may be used to stabilise an oil phase in a food product when used as an ingredient in conventional processes for preparing the food products. Though not wishing to be bound to theory and without limiting the scope of the invention an explanation could be that the granules during the processing of the food product are broken-up by mechanical forces, and the fragments are able to stabilize an oil phase.

Therefore, the invention also relates to a process for the preparation of an edible dispersion comprising;
a) an oil phase,
b) a structuring agent; and,
c) an aqueous phase and optionally a solid phase, in which the dispersion is formed by mixing oil, structuring agent and the aqueous phase and optionally additionally a solid phase,
wherein the structuring agent is a granule according to the present invention.

Further the granules may be used in a process for preparing bouillon or seasoning cubes, the process comprising the steps of:
a) mixing 2-99% of particulate ingredients comprising one or more of salt, flavour enhancers, spices, herbs, flavourants, sugar, yeast extract, or hydrolysed vegetable protein, with 1-98% of fat solid at 20° C. in particulate form,
b) pressing to cubes,
wherein the fat in particulate form comprises granules according to the present invention.

In the process as given above wide ranges of the amount of ingredients are given. The actual amount depends e.g. on the intended use. For bouillon (incl. broth and stock and the like) cubes the amount of fat is preferably 1-30%, more preferably 2-25%. For seasonings (incl. melting) cubes the amount of fat is preferably 10-99%, more preferably 20-70%. Cubes e.g. for soups and sauces can have fat contents of 5-60%, preferably 10-50%. All percentages are percentages by weight of the total cube. For very low amounts of fat (e.g. 1-5%) it may be needed to include ingredients of which it is known that they aid compressing into a tablet, like maltodextrin and/or moist ingredients.

The invention further relates to a particulate seasoning or concentrate for preparing a bouillon, broth, soup or sauce comprising 0.5-60 wt. % of fat and 40-99.5 wt. % of one or more of salt, flavour enhancers, starch, starch derivatives, sugar, herbs, spices, vegetable particulates, flavours, colourants, wherein the fat comprises granules according to the present invention.

Benefits of this invention can be separated in what we can define as customer benefits and consumer benefits. Customer benefits are mainly present in intermediate products. These benefits reveal during storage and production of final products. Consumer benefits reveal in the final products. The benefits described here neglect the benefits of the use of micronised powders, which are numerous already.

Customer Benefits:
reduced dustiness of the powder,
reduced volume of the powder, that is a higher bulk density,
improved flow properties of the powder,
possibility to store ingredients which enable instant production,
improved dispersion properties if the powder is dispersed in oil.

Consumer Benefits:
lower SAFA-content of the powder product and the tablet if tablets are pressed from the powder,
ability to build in water components, if w/o-emulsions are used to granule the powder,
ability to build in components that are water or oil soluble, such as anti-spattering emulsifiers, etc.,
ability to co-granule components that are solids, like olive-scrap, etc.,

EXAMPLES

General/Methods

Bulk Density

The bulk density is measured by determining the volume of 100 g of material in a measuring cylinder and is expressed as kg/l and the gluten content is measured by AACC method 38-10 ($9^{th}$ Ed, 1995).

Dynamic Flow Rate

For the purposes of this invention, the flow properties of the granular product are defined in terms of the dynamic flow rate (DFR), in ml/s, measured by means of the following procedure. A cylindrical glass tube of internal diameter of 35 mm and length of 600 mm is securely clamped with its longitudinal axis in the vertical position. Its lower end is terminated by a cone of polyvinyl chloride having an internal angle of 15' and a lower outlet orifice of diameter 22.5 mm. A first beam sensor is positioned 150 mm above the outlet, and a second beam sensor is positioned 250 mm above the first sensor.

To determine the dynamic flow rate the outlet orifice is temporarily closed and the cylinder filled with the granular product to a point about 10 cm above the upper sensor. The outlet is opened and the flow time t (seconds) taken for the powder level to fall from the upper sensor to the lower sensor measured electronically. This is repeated 2 or 3 times and an average time taken. If V is the volume (ml) of the tube between the upper and lower sensors, the DFR is given by V/t.

Unconfined Compressibility

The unconfined compressibility test (UCT) provides a measure of the cohesiveness or "stickiness" of a product and can provide a guide to its storage properties in, for example, silos. The principle of the test is to compress the granular product into a compact and then measure the force required to break the compact. This is carried out using an apparatus comprising a cylinder of diameter 89 mm and height 114 mm (3.5×4.5 inches), a plunger and plastic discs and weights of predetermined weight as follows.

The cylinder, positioned around a fixed locating disc and secured with a clamp, is filled with granular product and the surface leveled by drawing a straight edge across it. A 50 g plastic disc is placed on top of the granular product, the plunger lowered and a 10 kg weight placed slowly on top of the upper plunger disc. The weight is left in position for 2 minutes after which time the 10 kg weight is removed and plunger raised. The clamp is removed from the cylinder and the two halves of the cylinder carefully removed to leave a compact of granular product. If the compact is unbroken, a second 50 g plastic disc is placed on top of the first and left for approximately ten seconds. If the compact is still unbroken, a 100 g disc is placed on top to the plastic discs and left for ten seconds. If the compact is still unbroken, the plunger is lowered very gently onto the discs and 250 g weights added at ten second intervals until the compact collapses. The total weight of plunger, plastic discs and weights at collapse is recorded.

The cohesiveness of the powder is classified by the weight required to break the compact as follows. The greater the weight required, the higher the UCT value and the more cohesive ("sticky") the powder.

As used herein, unless stated explicitly to the contrary, the term "fines", refers to particles with a diameter of less than 180 microns. Further, reference to "coarse" material, means particles with a diameter greater than 1400 microns. Levels of fine and coarse particles can be measured using sieve analysis.

Stevens Value

Stevens values give an indication about the firmness of a product. The firmness of all products stored at 5° C. for 24 hours was measured at room temperature using a Stevens Texture Analyser (1 mm/sec, 25 mm depth, 4.4. mm probe) and is quoted herein as the Stevens value (in g).

Example 1

To find the optimal liquids/solids ratio a set of experiments was done with micronised high erucic rapeseed hardened to 70° C. (RPh070) and sunflower oil (SF). The set of experiments was done with varying liquids/solids ratios as can be seen in the table. The observations during and just after granulation are described in the same table.

TABLE 1

Result of tests for granulation conditions

| SF [g] | RPh070 [g] | Vol. fraction solids [%] | Observations |
|---|---|---|---|
| 20 | 30 | 40 | Still very dusty powder |
| 22.5 | 27.5 | 45 | Dusty powder |
| 25 | 25 | 50 | Nice granule, but still some dustiness |
| 27.5 | 22.5 | 55 | Coarse granule, but still flowing |
| 30 | 20 | 60 | One fatty lump instead of powder |

From these granulation experiments it became clear that the volume fraction of solids of 50% was optimal for further experiments. However, after storage still some dustiness occurred.

Examples 2-4

Instant spreads (i.e. spreads that can be made using conventional home kitchen mixer) were prepared as follows.

Spreads were produced with a composition as in table 2. Stable spreads resulted. The water phase was made by mixing the salt in distilled water and holding the mixture at room temperature. The fat phase was produced by adding the micronised fat powder to liquid oil using a spatula. The water phase and the oil phase were mixed using a home kitchen mixer.

It was possible to prepare a stable spread without emulsifier and thickener. The long term stability and/or consistency of the spread without emulsifier may be improved by adding a thickener to the water phase, e.g. 1 wt. % starch, a suitable starch type is Resistamyl 310.

The solid ingredients (i.e. all ingredients except water and oil) may be packed together. At home these ingredients may be mixed with oil and water.

TABLE 2

Composition of instant spreads of examples 2-4

| | Ingredient | Ex. 2 Amount (wt. %) | Ex. 3 Amount (wt. %) | Ex. 4 Amount (wt. %) |
|---|---|---|---|---|
| Oil Phase | | 39.85 | 34.85 | 34.85 |
| | Sunflower oil | 29.49 | 25.79 | 25.79 |
| | Granulated fat powder[1] | 10.36 | 9.06 | 9.06 |
| | Beta-carotene (0.4 wt. % sol in SF) | 0.15 | 0.15 | 0.15 |
| Water phase | Water | 59.5 | 64.5 | 44.5 |
| | Salt | 0.5 | 0.5 | 0.5 |
| | Starch solution (5% Resistamyl 310) | | | 20 |
| | Total | 100 | 100 | 100 |

[1]Hardstock fat as prepared in example 3 of WO96/19115 which was micronised as in example 1 of PCT/EP2004/006544 and granulated as in example 1 with sunflower oil in ratio 1:1 (w/w).

The invention claimed is:

1. Granule comprising:
   a) solid micronised lipid powder particles that have a microporous structure; and,
   b) a liquid;
wherein the granule is an agglomeration of said lipid particles herein described as secondary particles; and wherein said secondary particles are agglomerates of primary lipid particles, said primary lipid particles are platelets having an average thickness of 0.01-0.5 μm.

2. Granule according to claim 1, having a liquid content of 40-60 wt %.

3. Granule according to claim 1, wherein the liquid is vegetable oil or a water-in oil emulsion comprising vegetable oil.

4. Granule according to claim 1, wherein the lipid powder particles are micronised fat particles.

5. The granule according to claim 4 wherein the micronised particles were prepared by preparing a homogeneous mixture of structuring agent and liquefied gas or supercritical gas at a pressure of 5-40 MPa and expanding the mixture through an orifice, under such conditions that a spray jet was applied in which the structuring agent was solidified and micronised.

6. Process for the preparation of an edible dispersion comprising;
   a) an oil phase,
   b) a structuring agent; and,
   c) an aqueous phase, including forming the dispersion by mixing oil, structuring agent and the aqueous phase;
wherein the structuring agent is a granule comprising solid fat according to claim 1 wherein crystals of the solid fat form a network throughout the liquid oil resulting in a structured fat phase wherein aqueous phase droplets are fixed within spaces of a lattice of the crystals of the solid fat so that coalescence of the droplets and separation of the heavier aqueous phase from the fat phase is prevented.

7. The granule according to claim 1 wherein the structuring agent is edible fat.

8. The granule according to claim 1 wherein the liquid includes vegetable oil.

9. The granule according to claim 1 wherein the structuring agent comprises triglyceride.

* * * * *